United States Patent
Massey et al.

(10) Patent No.: US 7,505,152 B2
(45) Date of Patent: Mar. 17, 2009

(54) OPTICAL METROLOGY SYSTEM

(75) Inventors: Cameron G. Massey, Hawthorne, CA (US); William Barvosa-Carter, Ventura, CA (US); Hans Bruesselbach, Monte Nido, CA (US); Robert Doty, Los Angeles, CA (US); Guillermo Herrera, Winnetka, CA (US); Michael Nolan, Hermosa Beach, CA (US)

(73) Assignee: The Boeing Company, Chicago, IL (US)

( * ) Notice: Subject to any disclaimer, the term of this patent is extended or adjusted under 35 U.S.C. 154(b) by 51 days.

(21) Appl. No.: 11/065,623

(22) Filed: Feb. 24, 2005

(65) Prior Publication Data

US 2006/0187470 A1 Aug. 24, 2006

(51) Int. Cl.
*G01B 11/14* (2006.01)
(52) U.S. Cl. ........................ 356/614; 356/124
(58) Field of Classification Search ................. 356/614, 356/124, 369, 403; 250/204
See application file for complete search history.

(56) References Cited

U.S. PATENT DOCUMENTS

| | | | | |
|---|---|---|---|---|
| 3,521,956 A | * | 7/1970 | Froome et al. ............. 356/5.15 |
| 4,592,057 A | * | 5/1986 | Comerford .................... 372/8 |
| 5,737,068 A | * | 4/1998 | Kaneko et al. ............ 356/5.13 |
| 6,459,492 B1 | * | 10/2002 | Hercher ..................... 356/622 |
| 2001/0011712 A1 | * | 8/2001 | Castenmiller et al. ....... 250/548 |
| 2002/0085286 A1 | * | 7/2002 | Drodofsky et al. .......... 359/619 |
| 2003/0076510 A1 | * | 4/2003 | Clifford et al. ............. 356/630 |
| 2004/0061042 A1 | * | 4/2004 | Almogy et al. .......... 250/208.1 |
| 2004/0190005 A1 | * | 9/2004 | Doucet et al. ............... 356/614 |
| 2004/0202400 A1 | * | 10/2004 | Kochergin et al. ............ 385/12 |
| 2006/0114478 A1 | * | 6/2006 | Borden et al. ............... 356/636 |

\* cited by examiner

*Primary Examiner*—Gregory J Toatley, Jr.
*Assistant Examiner*—Tri T Ton
(74) *Attorney, Agent, or Firm*—Jonathan W. Hallman; MacPherson Kwok Chen & Heid LLP

(57) ABSTRACT

An optical metrology system having an optical metrology sensor assembly and a target is disclosed. The optical metrology sensor assembly transmits a light beam to the target and then uses the reflected beam from the target to determine the position of the target in three dimensions. The optical metrology sensor can comprise a light source, a ranging device, and a two-dimensional sensor. The optical metrology system is suitable for applications such as determining the position, orientation, and shape of a spacecraft antenna, so as to facilitate movement thereof to enhance operation of the antenna.

19 Claims, 5 Drawing Sheets

US 7,505,152 B2

OPTICAL METROLOGY SYSTEM

TECHNICAL FIELD

The present invention relates generally to optical metrology and, more particularly, to a laser metrology system suitable for use on spacecraft structures.

BACKGROUND

Metrology systems for providing position information regarding various structures are known. Metrology systems can be used to accurately measure the position of various points on a structure, so as to facilitate determination of the position, orientation, and/or shape of the structure.

For example, there is a need to know the position of line-of-sight communications and radar antennas. This need is particularly acute on spacecraft, where small deviations in the desired position of antenna elements and/or antenna supporting structures can substantially reduce the effectiveness of an antenna due to the large signal transmission distances involved. Typically, spacecraft must transmit and receive signals over distances of many thousands, sometimes millions, of miles. It is important for their antennas to be properly aligned and configured.

One contemporary method for determining the position of the elements of spacecraft antennas and the like to mount strain gauges thereon. The strain gauges are configured to detect movement of these elements away from their intended positions. In this manner, the orientation and shape of the antenna can be characterized.

However, as those skilled in the art will appreciate, such strain gauges are subject to variations in response due to temperature. Portions of a spacecraft may vary widely in temperature, as they are repeatedly exposed to the sun and then shaded from the sun. This is particularly true for satellites in geosynchronous orbit, where sunlight exposure can be substantial. Therefore, the use of strain gauges is not always an acceptable way to determine the position of spacecraft structures.

Other space metrology systems have been developed. For example, one system uses mechanically scanned laser radar to measure the distance to reflective targets arranged radially on a surface. Target position is determined by correlating the return signal and the scan angle. This method is capable of measuring multiple targets at a given scan angle as long as the targets are sufficiently spaced apart from one another, however this method lacks desired precision.

Another system uses a CCD-based device capable of tracking multiple illuminated targets (e.g., LEDs or reflectors) with sufficient precision for many space applications. The system is similar to currently-fielded star trackers. However this system is capable of making precision measurements in only two translational modes. This system does not provide range information.

As a result, there is a need in the art for a metrology system that is capable of the precise position measurement of a point on a structure in all three dimensions. Such a system should be substantially insensitive to the detrimental effects of sunlight, making it is suitable for spacecraft applications such as determining the position, orientation, and/or shape of antennas, other line-of-sight devices such as laser sources, and the like.

SUMMARY

Systems and methods are disclosed herein to provide optical metrology suitable for remotely tracking the movement of a target in three dimensions. For example, in accordance with one aspect of the present invention, an optical metrology system can monitor the positions of elements of a communication or radar antenna to detect deviations from the intended positions thereof, such that the deviations can be corrected so as to enhance the effectiveness of the antenna.

According to one aspect of the present invention, the optical metrology system comprises an optical metrology sensor assembly and a target. The optical metrology sensor assembly transmits a beam of light to the target. The target reflects the beam back to the optical metrology sensor assembly, which uses the reflected beam to measure movement of the target in three dimensions.

More particularly, according to one aspect of the present invention, the optical metrology sensor assembly comprises a light source, a ranging device, a two-dimensional position sensitive detector (PSD), and associated optics. All of these components can optionally be contained within a common housing. As one alternative, the light source and optionally some optics may be packaged separately from the other optical metrology sensor assembly components.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the FIGURES.

DETAILED DESCRIPTION

Figure 1:
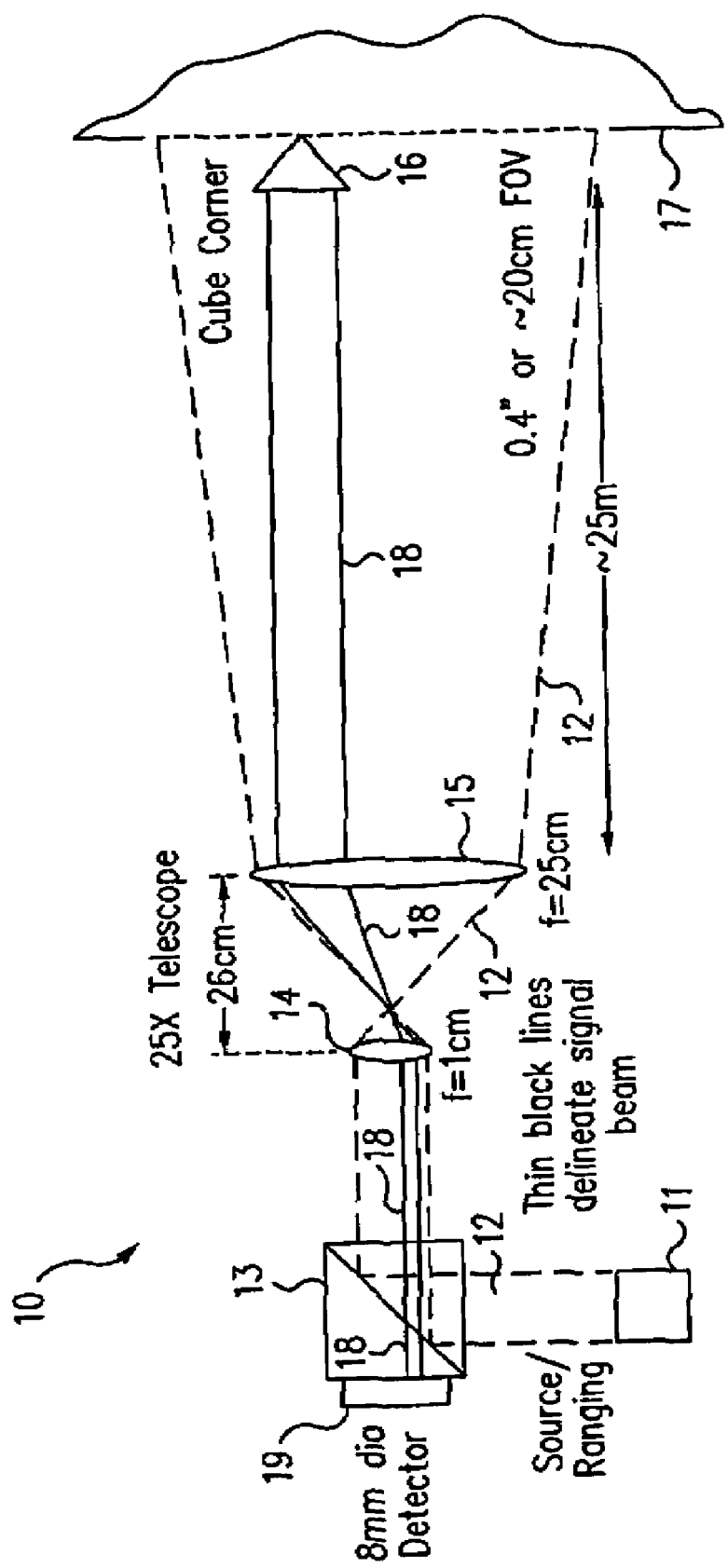
FIG. 1 is a semi-schematic diagram showing an exemplary implementation of the optical metrology system of the present invention, wherein components of the optical metrology sensor assembly are co-located (e.g., disposed within a common housing).

At least one aspect of the present invention comprises an optical metrology system that can remotely track the movement of a target in three dimensions. For example, the optical metrology system can be used to track and predict the dynamic behavior of large, flexible, space-borne structures such as communication and radar antennas.

According to one embodiment, the optical metrology system generally comprises an optical metrology sensor assembly and a target. The target is disposed upon a movable structure whose position is to be monitored. The optical metrology sensor assembly is disposed upon another structure, which can be located remotely (e.g., generally greater than several meters) with respect to the structure upon which the target is disposed. The structure upon which the optical metrology sensor assembly is disposed can be considered a fixed structure, since it is movement of the movable structure with respect to the fixed structure which is desired to be monitored.

The optical metrology sensor assembly provides light that is directed toward the target and reflected therefrom back to the optical metrology sensor assembly. The optical metrology sensor assembly then determines the range to the target and the two-dimensional position thereof, thus providing the relative three-dimensional position of the target.

More particularly, according to one embodiment of the present invention, the optical metrology sensor assembly comprises a light source, a ranging device, a two-dimensional position sensitive detector (PSD), and associated optics. The light source can comprise a laser light source. The optics can comprise one or more lenses, a filter and a beam splitter. All of these components can optionally be contained within a common housing. All of these components can operate using a common wavelength of light to simplify construction.

The light source can project a light beam over an angle that covers a specified range of movement of a specified point of the movable structure. The angle determines the dynamic range of the optical metrology system. That is, the angle determines how much movement of the specified point can be monitored by the optical metrology system of the present invention.

The maximum angle of the light beam is determined, at least in part, by the power of the light beam, the configuration of the optics, and the desired resolution for two-dimensional position determination. A wider beam generally requires more power of the light beam, since the beam becomes weaker as it is spread over a greater angle and since the PSD requires a return signal that provides an acceptable signal-to-noise ratio. The optics determine how much the beam spreads. Since the PSD has a fixed resolution, the position resolution of the optical metrology system is reduced as the angle is increased. This is true because the fixed resolution PSD must resolve a greater range of total distance.

The reflector is disposed at the specified point upon the structure whose position is being monitored and returns light through the optics and onto the two-dimensional PSD. The PSD determines that component of relative displacement of the movable structure that is generally orthogonal with respect to the bore sight or optical axis of the optical metrology sensor assembly. That is, the PSD monitors movement of the movable structure within a plane.

The reflector also returns light through the optics and onto a ranging device. The ranging device determines the relative distance between the optical metrology sensor assembly and the target. Thus, the ranging device monitors movement of the movable structure in a direction that is generally orthogonal with respect to the plane within which the PSD monitors movement. The PSD and the ranging device cooperate to track movement of a point on the movable structure in three dimensions.

The output of the optical metrology sensor assembly can comprise three analog signals. These three analog signals can be processed to determine the movable structures location and speed with respect to the optical metrology sensor assembly. By combining the outputs of a plurality of such optical metrology systems, important lower dynamic modes of the movable structure can be detected and appropriate dynamic control strategies can be implemented and monitored to mitigate undesirable movement.

According to one exemplary embodiment, the present invention comprises a laser light source, a two-dimensional position sensitive detector (PSD) and a range measurement apparatus wherein the laser source is configured to illuminate and track one of a limited amount of reflective targets at the locations of critical antinodes on the structure. The relative location and speed of the tracked points can be used to infer the shape of the structure within the accuracy needed for proper performance.

For a smaller number of targets (e.g., 1 to 10 targets), two-dimensional PSDs are a viable alternative to charge coupled device (CCD) based systems and can be implemented at a substantially lower cost than CCDs having comparable accuracy. Operationally, PSDs are typically less capable than CCDs in terms of flexibility and the capability to sense large numbers of targets over a wider field.

However, these disadvantages may be mitigated in practice. First, PSDs, as single target devices, are much faster than CCDs. Also, in a typical communications satellite configuration, the antennas are positioned east/west relative to the spacecraft bus. In this case, the sun will likely pass through the field-of-view of a sensor, causing saturation and perhaps degradation or damage. PSDs, with their narrower field-of-view, tend to block out the sun and extend the service time of the device.

Figure 2:
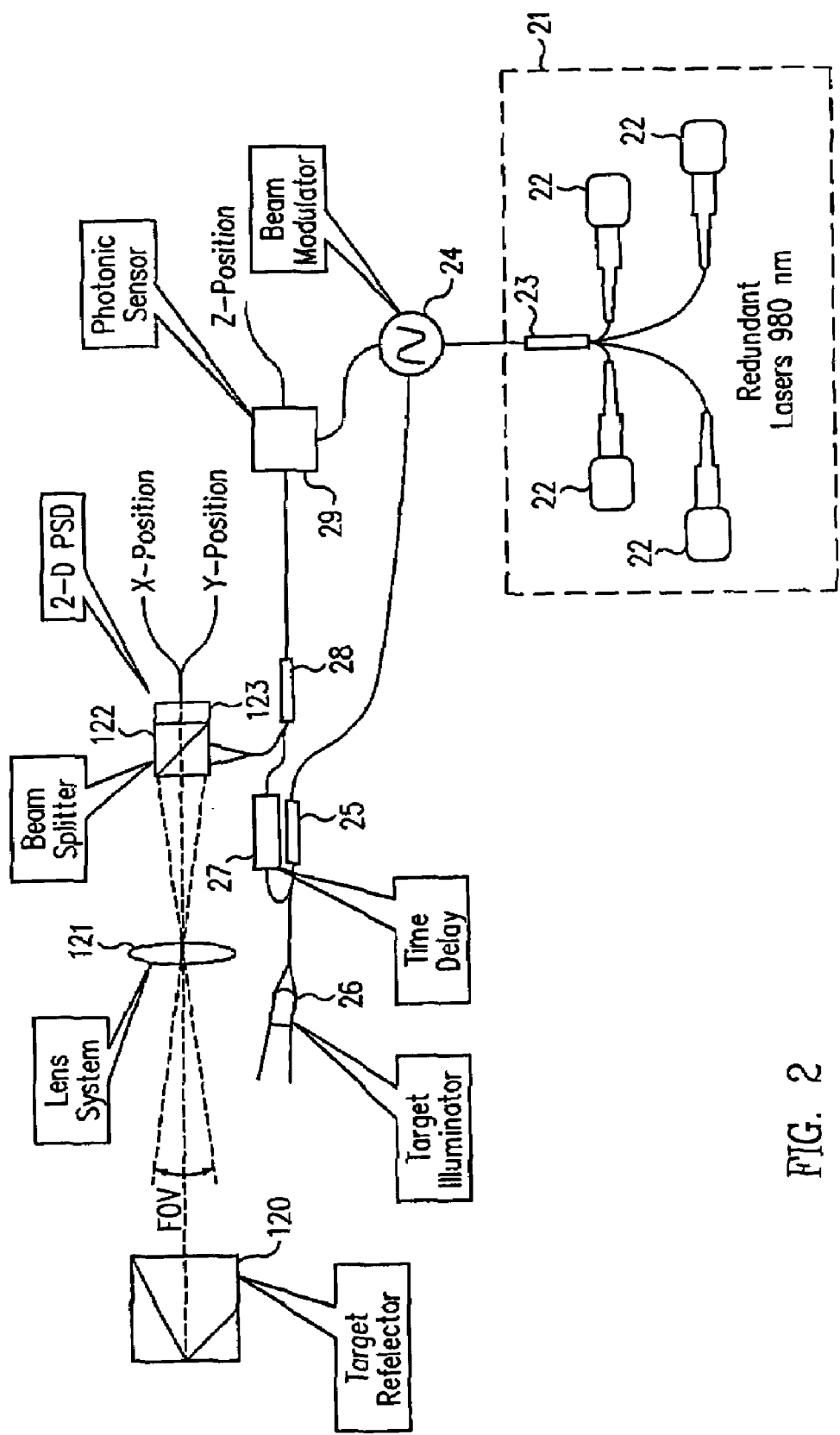
FIG. 2 is a semi-schematic diagram showing another exemplary implementation of the optical metrology system of the present invention, wherein an illuminator is dispose apart from other components of the optical metrology sensor assembly (e.g., is not disposed within a common housing therewith).

FIGS. 1 and 2 show exemplary implementations of the optical metrology system of the present invention. In FIG. 1 the target illumination signal and the ranging return share the same aperture and can be separated by a circulator. The length of the optical metrology sensor assembly is reduced using telescope-type optics. In FIG. 2 the optics comprises a simple lens, sized to the desired return signal. Also shown in FIG. 2 is a possible implementation of the frequency-modulated ranging system and a separate illumination lens. The details of the optics, such as the focal distance, lens aperture diameter, as well as the use of shades, filters and coatings, can be modified to optimize performance for the particular mission requirements.

Figure 3:
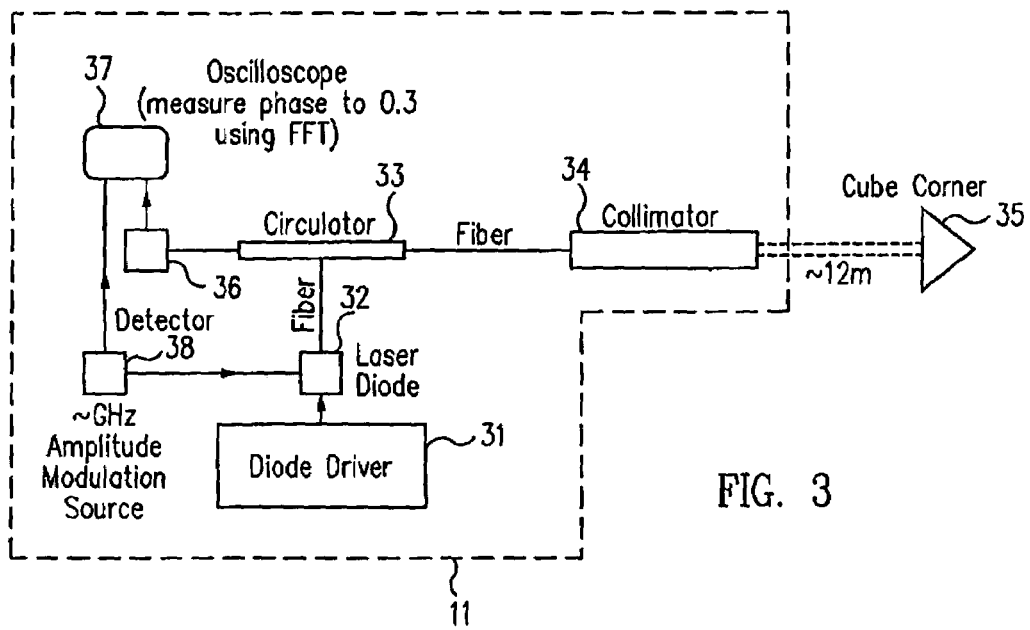
FIG. 3 is a semi-schematic diagram showing an exemplary test setup for an amplitude modulation method for laser ranging according to one aspect of the present invention.

With particular reference to FIG. 1, a light source and ranging module 11 comprises a laser light source and a ranging device (examples of which are better shown in FIG. 3). The laser light source transmits a light beam 12 through a beam splitter 13 to optics. Beam splitter 13 also functions to direct a portion of a returning beam back to light source and ranging module 11 and to direct a portion of the returning beam to a detector, such as PSD 19, as discussed below.

In this exemplary embodiment, the optics comprise a first lens 14 having a focal length of 1 cm and a-second lens 15 having a focal length of 25 cm. First lens 14 and second lens 15 cooperate to define a 25× telescope. Light source and ranging module 11, beam splitter 13, detector 19, first lens 14, and second lens 15 cooperate to define an optical metrology sensor assembly 10.

Transmitted light beam 12 travels to a target or reflector 16 that is attached to a structure, such as an element 17 of a spacecraft antenna. Reflector 16 can be a cube corner reflector. It is worthwhile to note that transmitted light beam 12 covers an area that is much larger than reflector 16 where transmitted light beam 12 is incident upon element 17. That is, transmitted light beam 12 illuminates a portion of element 17 and the area of illumination defines the range of movement that can be sensed.

Reflector 16 reflects a portion of transmitted light beam 12 back toward optical metrology sensor assembly 10 to define reflected beam 18. First lens 14 and second lens 15 resize the return of reflector 16 such that it passes through beam splitter 13 and is incident upon both the PSD 19 and the ranging module 11.

The ranging device of light source and ranging module 11 determines range information and PSD 19 determines the two-dimensional position of the reflector 16 within a plane that is generally orthogonal with respect to the optical axis of light beam 12. Thus, three-dimensional position information is provided for the point on element 17 where reflector 16 is located.

With particular reference to FIG. 2, an exemplary implementation of the optical metrology system of the present invention utilizes a separate illuminator 26. That is, illuminator 26 is not disposed within a common housing along with the other components of the optical metrology sensor.

More particularly, the optical metrology system comprises an array of redundant lasers 21 that comprises a plurality of individual lasers 22, such as 980 nm lasers. A combiner 23 combines the outputs of lasers 22 and provides the combined output to a modulator 24. Modulator 24 modulates the beam to facilitate ranging according to well known principles. One output of modulator 24 is provided to a photonic sensor 29 as a reference beam and another output of modulator 24 is provided to a splitter 25. Splitter 25 separates the beam into one output for the target illuminator and another output that is provided to a time delay 27 and then transmitted through a combiner 28 to photonic sensor 29.

Illuminator 26 directs the laser beam to a target or reflector 120. Reflector 120 can be a cube corner reflector. The beam from illuminator 26 spreads over an angle that defines the dynamic range of the optical metrology system, as better shown in FIG. 1. When reflector 120 is within the spread beam, it reflects the laser beam back to the optical metrology sensor assembly.

The optical metrology sensor assembly comprises a lens 121 that focuses the reflected beam onto a beam splitter 122. One portion of the laser beam is directed to PSD 123 to facilitate determination of the two-dimensional position of reflector 120. Another portion of the laser beam is directed to combiner 28, where it is combined with the delayed laser beam from a delay 27 and then provided to photonic sensor 29 to facilitate ranging according to well known principles.

Referring now to FIG. 3, an exemplary test setup for laser ranging through a common aperture illustrates the ranging aspect of the present invention. The test setup comprises a diode driver 31 that drives a fiber-coupled laser diode 32. Fiber-coupled laser diode 32 provides light to a circulator 33. Circulator 33 directs the light from the laser diode 32 to a collimator 34, from which collimated light travels to a reflector 35. The reflector can comprise a corner cube reflector which may be called the target.

Light reflected from the reflector 35 passes again through collimator 34 and to circulator 33. Circulator 33 is configured to pass the reflected light to a detector 36. Detector 36 forms an electrical signal representative of the reflected light. This electrical signal is sent to an oscilloscope 37, as one input thereof.

A modulation source 38, such as a GHz amplitude modulation source, provides a first modulation signal to laser diode 32 to effect modulation of the laser beam output thereof. The modulation source 38 also provides a second modulation signal (which can be the same as first modulation signal) as a reference to oscilloscope 37. Oscilloscope 37 provides an indication of the phase relationship of the signal from detector 36 with respect to the reference or second modulation signal from the modulation source 38. As those skilled in the art will appreciate, this phase relationship is representative of the distance between the optical metrology sensor assembly and the reflector 35. Thus, ranging information can be obtained from the reflected light and the reference signal according to well known principles.

Figure 4:
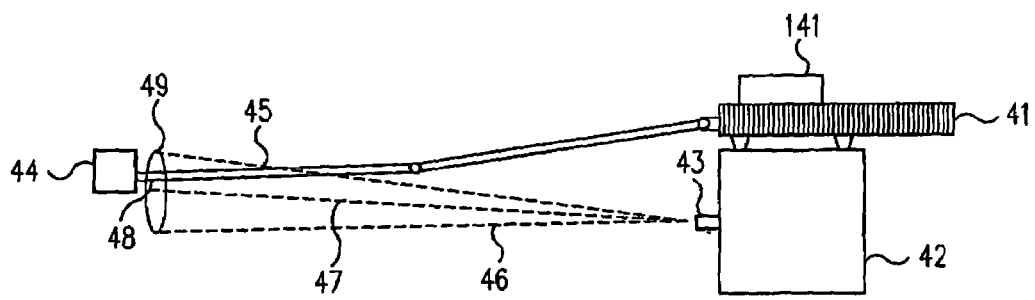
FIG. 4 is a semi-schematic diagram showing an exemplary optical metrology system in a single unit (one optical metrology sensor assembly and one target) application, according to one aspect of the present invention.

FIG. 4 shows the embodiment of FIG. 1 implemented so as to track a single point in three directions. A spacecraft's primary payload 41 is attached to a spacecraft bus 42. An optical metrology sensor assembly 43 of the present invention is attached to spacecraft bus 42 and thus provides a fixed reference for position measurement of a point on a remote payload 44 with respect thereto. The remote payload 44 is disposed remotely with respect to the primary spacecraft bus 42. The remote payload may be an element of a communication or radar antenna, an element of a laser communication device, or any other item for which it is desirable to know the precise location thereof.

As boom 45 deforms, such as due to thermal stress, vibration, inertial stress, aging, or for any other reason, the remote payload 44 moves. For example, remote payload 44 may have a total expected range of movement as indicated by circle 49. A target, which comprises a reflector 48 is placed upon the remote payload 44. An illumination beam 46 from the optical metrology sensor assembly 43 subtends an angle that is sufficient to maintain reflector 48 within the illumination beam 46 throughout the total expected range of movement of remote payload 44.

Reflector 48 reflects a portion of the illumination beam 46 back to the optical metrology sensor assembly 43, thus defining reflected beam 47. The path of reflected beam 47 depends upon the position of reflector 48 and thus upon the position of remote payload 44. The reflected beam 47 is used by the optical metrology sensor assembly 43 to determine the three-dimensional position of the remote payload 44 (or at least of a point thereon), according the methodology discussed in conjunction with FIGS. 1-3 above.

Optionally, primary payload 41 can comprise a dynamic control system 141 for implementing dynamic control strategies that mitigate undesirable movement of the remote payload 44. Thus, as undesirable movement of remote payload 44 is detected, dynamic control system 141 compensates by moving the boom 45 so as to reposition the remote payload 44, as desired. Dynamic control system 141 does not have to be a part of the primary payload 41, and can alternatively be, for example, a part of the spacecraft 42.

Figure 5:
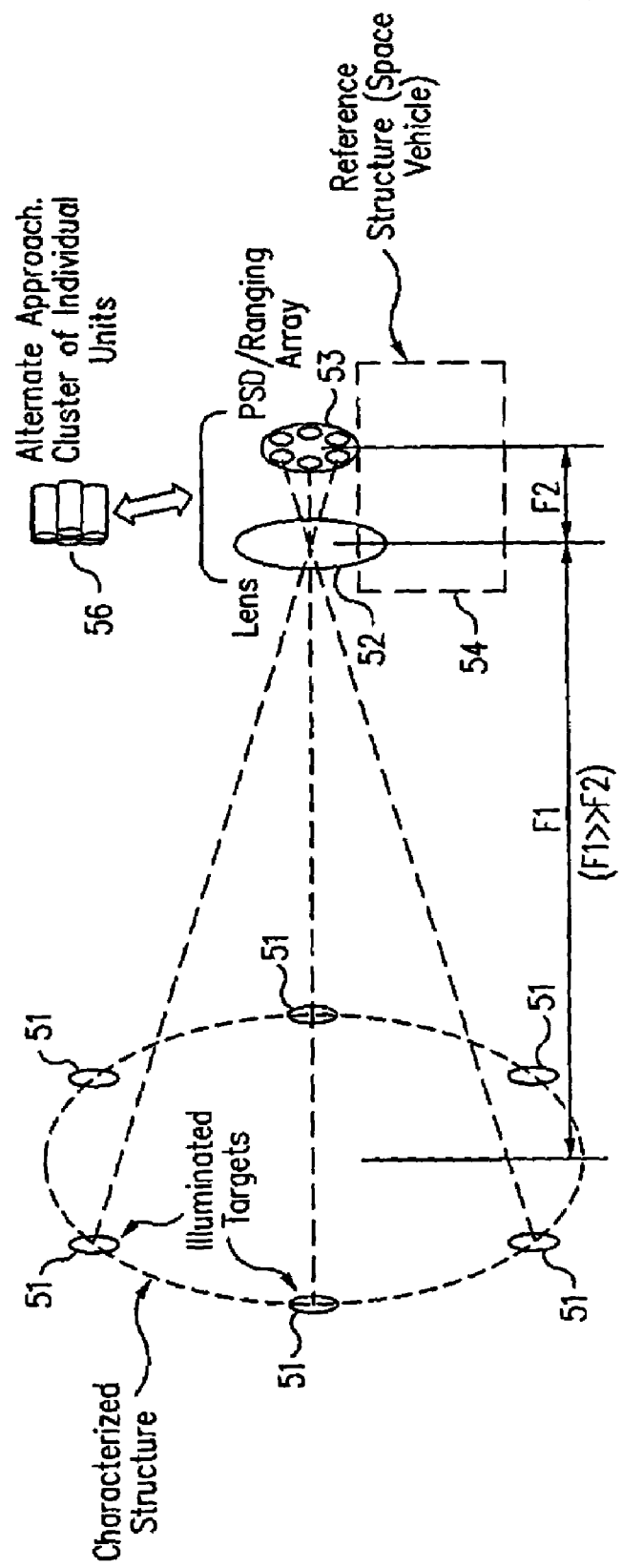
FIG. 5 is a semi-schematic diagram showing an exemplary optical metrology system in a multi-target application, according to one aspect of the present invention.

FIG. 5 shows an exemplary multi-target configuration of the optical metrology system of the present invention. The use of multiple targets better characterizes the position, orientation, and/or shape of the structure being monitored. Thus, a plurality of optical reflectors 51 are located at key points on a structure whose movement is to be characterized. For example, reflectors 51 can be located along the edge of a large hoop-truss reflector, such as that of a dish antenna.

A plurality of sensors, such as those defining PSD/ranging array 53 can be attached to a fixed reference structure 54, such as a bus of a spacecraft. The sensors can be arranged either as a cluster of individual units 56, each having its own lens aperture, or as a sensor array 53 having a common lens aperture 52.

According to one or more embodiments of the present invention, the lasers and a bulk of the associated electronics can be packaged within the spacecraft to moderate temperature and radiation effects. Where possible, common components can be used for a cluster of units (lasers, modulator, etc.) to further reduce parts and/or enhance redundancy.

Figure 6:
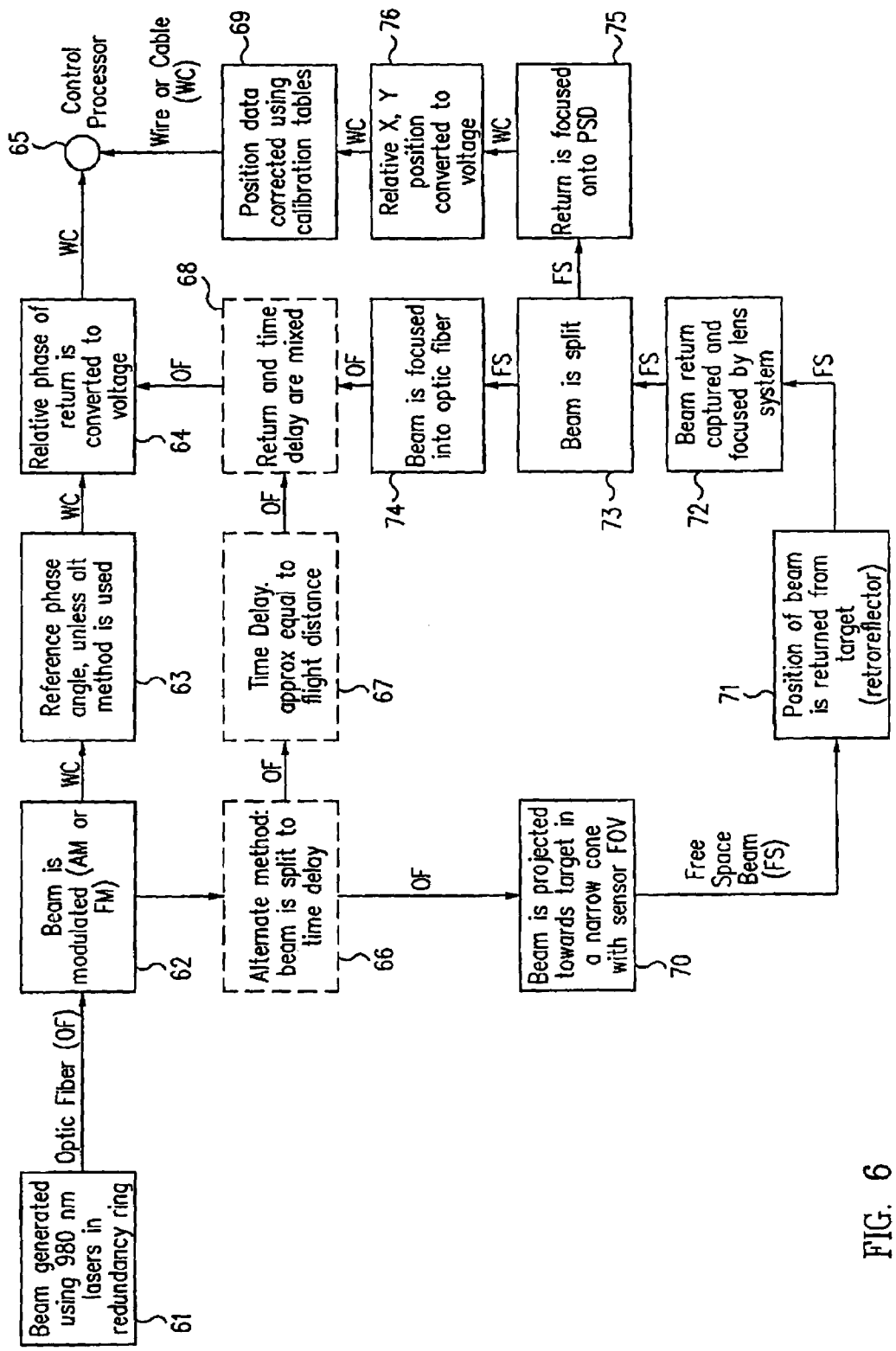
FIG. 6 is a flow diagram of two exemplary implementation methods of the optical metrology system of the present invention.

FIG. 6 is a functional flow diagram for an exemplary configuration of the optical metrology system of the present invention. The progression from signal generation through free space (FS) projection to a PSD sensor and through wire or cable (WC) to a signal processor is shown. Also shown is an alternative method to improve range performance, wherein a splitter before the free space illuminator routes a portion of the signal through an optical time-delay that matches the nominal distance to the target. This allows for a correction in small irregularities from one modulation cycle to the next.

A light beam is generated, such as by using a one or more 980 nm lasers in a redundancy ring, as shown in block 61. The beam is modulated, such as via amplitude and/or frequency modulation, as shown in block 62. An electrical signal is transmitted by wire or cable (WC) that is representative of a reference phase angle as shown in block 63, unless the alternate method is used as discussed below.

The modulated beam is projected toward the target (that is, the reflector), in a narrow cone as shown in block 70. The area where the light beam is incident upon the target, throughout the expected range of motion of the target, is within the field of view (FOV) for at least one optical metrology sensor assembly.

A portion of the beam is reflected by the target back toward the optical metrology sensor assembly, as shown in block 71. The reflected beam is captured and focused by a lens assembly, as shown in block 72. The returned beam is split into two components, as shown in block 73. One component is focused into an optic fiber, as shown in block 74. The relative phase of this component (with respect to the phase of the reference signal) is converted into a voltage, as shown in block 64. This voltage is provided to control processor 65 to facilitate determination of the range to the target.

The other component of the split returned beam is focused onto a PSD to provide two-dimensional position information, as shown in block 75. The relative two-dimensional position information is converted into an electronic signal, such as a voltage signal, as shown in block 76. The position data for the structure whose position is being monitored can then be updated, such as by using calibration tables to convert the electrical position information into new position data as shown in block 69.

An alternative method of optical metrology is shown by performing the acts shown in the dashed boxes of FIG. 6. According to this alternative method, the modulated beam is split, as shown in block 66. A portion of the beam is provided to a time delay, which delays the beam by a time that is approximately equal to the time for the illuminating beam to travel to the target and for the reflected beam to travel back to the optical metrology sensor assembly (i.e., the flight time), as shown in block 67. The returned beam and the time delayed beam are mixed, as shown in block 68. The relative phase of the returned beam and the time delayed beam is determined and converted to a voltage, as shown and block 64. The voltage is processed as discussed above. Further, the two-dimensional position information is obtained as discussed above.

The optical metrology system of the present invention can be manufactured using materials having known resistance to degradation in a space environment.

The present invention can provide precise and continuous relative position measurement of a remotely located movable structure with respect to an optical metrology sensor assembly. An optical metrology system comprising a plurality of optical metrology sensor assemblies and targets can facilitate the dynamic control of various structures. For example, such an optical metrology system may facilitate the use of large, lightweight, high-gain antennas on spacecraft where high signal power and extremely tight pointing budgets are required.

Moreover, the present invention provides a viable, lower cost, lower risk alternative to other metrology systems. The lower cost and lower risk enable larger, lighter antennas to be used on spacecraft, thereby substantially enhancing the spacecraft's capability.

Since the target can be fixed to the movable structure, continuous measurement of movement can be obtained without the need for scanning and with approximately zero acquisition time. No rotating mechanisms are used. The analog outputs of the optical metrology sensor assembly enhance robustness, particularly in space applications.

Using a common wavelength for both the ranging device and the PSD reduces the required number of components needed for the optical metrology system of the present invention. Thus, the system mass and complexity is correspondingly reduced, making the present invention suitable for use in space applications.

Further, by using a common wavelength for both the ranging device and the PSD, a very narrow notch filter can be added to the optics to filter a substantial amount of incident solar radiation. Such filtering substantially enhances the sensitivity of the optical metrology sensor assembly.

By tracking a single target over a limited field-of-view, sensor performance degradation due to direct and reflected solar radiation is mitigated. For wider field applications that use charge coupled device (CCD) systems to track multiple targets from a single aperture, solar energy is more likely to interfere with the function of the device. This has greater importance for typical antenna system on geosynchronous spacecraft where the antenna structures are often positioned in an east/west orientation relative to the spacecraft bus and are much closer to the orbital plane of the earth relative to the sun.

The optical metrology system of the present invention facilitates the construction of a smart sensing system for monitoring the structural deformation of spacecraft antennas due to such factors as vibration, inertial stress, and thermal stress. Thus, satisfactory antenna pointing and stability control can be achieved. Such pointing and stability control is critical for the missions of communications and space-based radar (SBR) satellites, for example.

Thermal and inertial distortion of a spacecraft antenna's structural elements can undesirably limit the capabilities of fixed reflector systems, particularly when the elements are large. Moreover, in communications satellites, the ability to sense and control an antenna's geometry substantially impacts the requirements for signal power, thermal control, signal beam shape, power density, roll off and isolation. In an SBR system, the ability to sense and control an antenna's geometry substantially affects the spacecraft's ability to locate and track a target.

The present invention is suitable for measuring displacements of less than 1 mm with distances between the sensor assembly and the target being greater than 40 meters. Thus, suitable accuracy is provided to facilitate position monitoring and dynamic compensation for spacecraft structures, such as antennas.

Although the optical metrology system of the present invention is described herein as being suitable for use in spacecraft applications, such description is by way of example only, and not by way of limitation. The optical metrology system of the present invention may similarly be utilized in ground-based applications. Indeed, those skilled in the art will appreciate that the present invention may be used in many different applications wherein it is desirable to know the movement of one object with respect to another object.

Embodiments described above illustrate but do not limit the invention. It should also be understood that numerous modifications and variations are possible in accordance with the principles of the present invention. Accordingly, the scope of the invention is defined only by the following claims.

We claim:

1. An optical metrology sensor assembly comprising:
   a light source for illuminating a target;
   a ranging device receiving reflected light from the target and facilitating the determination of a distance to the target from the sensor assembly; and
   a two-dimensional position sensing detector defining a plane that intercepts reflected light from the target, the two-dimensional position sensing detector being configured to determine the location of the interception in the plane, wherein the ranging device includes:
   a circulator configured to direct light from the light source to the target;
   a detector configured to receive reflected light from the circulator and to provide an electronic signal that is representative thereof;
   a modulator coupled to modulate the light source and to provide a reference signal; and
   a processor receiving the reference signal and reflected light from the circulator, the processor being configured to determine a range from the reference signal and the reflected light signal.

2. The optical metrology sensor assembly as recited in claim 1, wherein the light source comprises a laser.

3. The optical metrology sensor assembly as recited in claim 1, wherein the light source comprises an array of redundant lasers.

4. The optical metrology sensor assembly as recited in claim 1, wherein the light source comprises a laser having a wavelength of approximately 980 nm.

5. The optical metrology sensor assembly as recited in claim 1, further comprising optics configured to direct an illuminating beam from the light source to the target in a manner that covers a predetermine field of view and configured to receive reflected light from the target and to direct a first portion of the reflected light to the ranging device and a second portion of the reflected light to the two-dimensional position sensing detector.

6. The optical metrology sensor assembly as recited in claim 1, further comprising a telescope configured to direct an illuminating beam from the light source to the target and configured to receive reflected light from the target.

7. The optical metrology sensor assembly as recited in claim 1, further comprising a beam splitter configured to direct a first portion of the reflected light to the ranging device and a second portion of the reflected light to the two-dimensional position sensing detector.

8. The optical metrology sensor assembly as recited in claim 1, wherein the light source, the ranging device, and the two-dimensional position sensing detector are packaged together.

9. The optical metrology sensor assembly as recited in claim 1, wherein the light source is packaged separately from the ranging device and the two-dimensional position sensing detector.

10. The optical metrology sensor assembly as recited in claim 1, wherein the ranging device uses a delayed light beam to facilitate the generation of a reference that is used to determine range.

11. The optical metrology sensor assembly as recited in claim 1, wherein the ranging device comprises a circulator for directing light from the light source to the target and for directing reflected light from the target to a detector.

12. The optical metrology sensor assembly as recited in claim 1, wherein the light source provides amplitude modulated light.

13. The optical metrology sensor assembly as recited in claim 1, wherein the light source provides frequency modulated light.

14. The optical metrology sensor assembly as recited in claim 1, further comprising a notch filter configured to pass wavelengths approximate to that of the light source to the ranging device and the position sensor.

15. An optical metrology sensor assembly comprising:
    a light source for illuminating a target;
    a ranging device receiving reflected light from the target and facilitating the determination of a distance to the target from the sensor assembly; and
    a two-dimensional position sensing detector defining a plane that intercepts reflected light from the target, the two-dimensional position sensing detector being configured to determine the location of the interception in the plane, wherein the two-dimensional position sensing detector partially defines a cluster of two-dimensional position arrays configured to receive reflected light from a corresponding plurality of targets, the reflected light being received through a dedicated aperture for each two-dimensional position sensor.

16. An spacecraft antenna dynamic compensation system comprising:
    an antenna attached to a structure of the spacecraft;
    a plurality of targets attached to the antenna;
    a dynamic mode control system comprising:
    a plurality of optical metrology sensor assemblies attached to the structure of the spacecraft, each optical metrology sensor assembly comprising:
    a light source for illuminating a target;
    a ranging device receiving reflected light front the target and facilitating the determination of a distance to the target;
    a two-dimensional position sensor receiving reflected light from the target and facilitating a determination of a two dimension position of the target; and
    a control system receiving signals from the optical metrology sensors and controlling movement of the antenna in response to the signals.

17. An optical metrology sensor assembly comprising:
    a light source for illuminating a target;
    a ranging device receiving reflected light from the target and facilitating the determination of a distance to the target, the ranging device comprising:
    a circulator configured to direct light from the light source to the target;
    a detector configured to receive reflected light from the circulator and to provide an electronic signal that is representative thereof;
    a modulator coupled to modulate the light source and to provide a reference signal;
    a processor receiving the reference signal and reflected light from the circulator, the processor being configured to determine a range from the reference signal and the reflected light signal; and a two-dimensional position sensor receiving reflected light from the target and facilitating a determination of a two dimension position of the target.

18. An optical metrology sensor assembly comprising:

a light source for illuminating a target;

a ranging device receiving reflected light from the target and facilitating the determination of a distance to the target; and a two-dimensional position sensor receiving reflected light from the target and facilitating a determination of a two dimension position of the target, the two-dimensional position sensor partially defining a plurality of two-dimensional position sensors configured to receive reflected light from a corresponding plurality of targets, the reflected light being received through a common aperture.

19. An optical metrology sensor assembly comprising:

a light source for illuminating a target;

a ranging device receiving reflected light from the target and facilitating the determination of a distance to the target; and a two-dimensional position sensor receiving reflected light from the target and facilitating a determination of a two dimension position of the target, the two-dimensional position sensor partially defining a cluster of two-dimensional position arrays configured to receive reflected light from a corresponding plurality of targets, the reflected light being received through a dedicated aperture for each two-dimensional position sensor.

* * * * *